United States Patent

[11] 3,582,129

| [72] | Inventor | Lester L. Frank |
| | | 6201 Sprague, Omaha, Nebr. 68104 |
| [21] | Appl. No. | 816,650 |
| [22] | Filed | Apr. 16, 1969 |
| [45] | Patented | June 1, 1971 |

[54] COLLAPSIBLE CAMPER
13 Claims, 2 Drawing Figs.

[52] U.S. Cl. .................................................. 296/23
[51] Int. Cl. .................................................. B60p 3/34
[50] Field of Search .................................... 296/23, 23 MC

[56] References Cited
UNITED STATES PATENTS
3,288,518  11/1966  Oliver .......................... 296/23
3,186,754  6/1965  Winstead .................... 296/23
3,145,046  8/1964  Orn .............................. 296/23

*Primary Examiner*—Philip Goodman
*Attorney*—George R. Nimmer

ABSTRACT: This invention relates to a downwardly collapsible camper of shelter of the rigid-shell-type construction mounted in combination with an open-top boxlike rollably transportable floored frame such as the rearward cargo box of a pickup truck motor vehicle. In particular, this invention provides a camper in which, in its downwardly collapsed form, the camper roof is disposed approximately 4 feet dimensionally above the frame floor so as to permit passengers to be transported overland within an unusually mobily stable camper, said camper being easily conveniently erected into its full lofty height, with the use of exceedingly simple, inexpensive, and reliable, auxiliary features of the camper structure.

LESTER L. FRANK
INVENTOR

BY George R Nimmer
ATTORNEY

LESTER L. FRANK
INVENTOR.

BY George R Nimmer
ATTORNEY

COLLAPSIBLE CAMPER

There are two generic classes of portable camping shelters, the flexible shell type and the rigid-shell type. The flexible shell type is customarily provided of canvas, tarpaulin, and similarly flexible structural material. This invention is concerned with hardy rigid-shell shelters comprising rigid external structural members, and is not concerned with the relatively frail flexible shell variety.

Portable rigid shelters for vacationers, campers, and sportsmen are customarily mounted upon an open-top boxlike floored frame such as a trailer or the cargo box of a pickup truck. Most of the prior art shelters are permanently erected, and accordingly, have a vertical height exceeding about 8 to 10 feet, including the height of the frame's wheels. Permanently-erected lofty portable shelters invariably extend above the draying means e.g. above an automobile sedan for a trailer-type camper, or above the cab of a pickup truck having the camper on the rearward cargo box. Such lofty portable shelters create air-resistance to the forward travel of the draying means so as to reduce the draying means efficiency e.g. in terms of miles per gallon gasoline yield. Further, the lofty center-of-gravity for permanently erected portable shelters, in combination with the air-resistance characteristics thereof, results in a dynamically unstable and unsafe condition during its overland highway transporting, thus providing steering problems for the driver-operator of the draying means, said operator being invariably a novice in pulling such lofty loads along a public roadway.

There are in the prior art erectable portable shelters that are collapsible into a portable form having a low center of gravity in order to provide more efficient and safer drayage thereof along a public roadway, especially by a novice driver-operator. However, the prior art collapsibly erectable portable shelters having rigid panels are invariably difficult and time-consuming to erect or collapsibly dismount, and it is difficult for these operations to be performed easily and safely by a single individual working without assistance. Further, many prior art collapsible portable structures require cumbersome internally located hydraulic jacks and other bulky internal structural members to support the erected shelter, said internal columns and other structural members further complicating the erection and dismounting operations and also detracting from the available internal occupancy space of the erected shelter. Other prior art devices in the downwardly collapsed form do not provide any appreciable amount of storage space therein for other types of gear, cargo, and camping equipment, nor is there comfortable accommodations for the passengers. Finally, those prior art collapsible shelters which are mounted to the cargo box of a pickup truck are notably deficient in internal occupiable space as well as being cumbersome and difficult to erect and collapse.

It is accordingly the general object of the present invention to provide a portable collapsible shelter structure that overcomes the several disadvantages and deficiencies of the prior art.

It is another object of the present invention to provide a portable collapsible shelter for use in conjunction with an open-box frame such as a trailer or the cargo compartment of a pickup truck that is exceedingly fast and easy to erect or collapse by a lone worker, without the use of separate extra tools. It is an ancillary object to provide a portable shelter which may be safely reversibly erected and collapsed without danger to a lone worker.

It is another object to provide a portable collapsible shelter that is structurally strong without the use of cumbersome and bulky internal support members.

It is an important object to provide a portable collapsible shelter that is provided with abundant internal storage space both in its collapsed and erected forms and which is exceedingly versatile in use. Ancillary to this important object, it is desired to provide sufficient internal storage space within the downwardly collapsed form to permit passengers to be comfortably seated therein during periods of overland transportation.

It is yet another object to provide a portable collapsible structure that is modifiable into alternate forms externally and internally, specifically for cargo carrying use and having a variety of selectable internal conveniences for passengers.

It is still another object to provide a portable collapsible structure that is economical to construct and to maintain.

It is another object to provide an exceedingly roomy and spacious portable collapsible shelter having adequate head room for a standing passenger even when used in combination with the arbitrary confines of a pickup truck cargo box frame.

It is another object to provide a camper or shelter that is safely and easily transportable overland in both its erected and collapsed forms.

With the above and other objects and advantages in view, which will be more particularly pointed out as the description proceeds, the invention comprises an upright riser member of permanent upright height and of substantially U-shaped horizontal cross section, said riser being attached to the cargo box and extending uprightly from the cargo box upper edge, and further comprising a reversibly erectable-collapsible canopy member attached to and disposed along the upper edge of the riser member, said canopy member including a vertically reciprocatable elongate horizontal roof member that is downwardly collapsible toward the riser member upper edge and that is pivotably attached to a rigid longitudinally slidable and ultimately uprightable pivotal-link disposed along the roof elongate edge to erect the canopy member.

In the drawing, wherein like characters refer to like parts in the several views, and in which.

Figure 1:
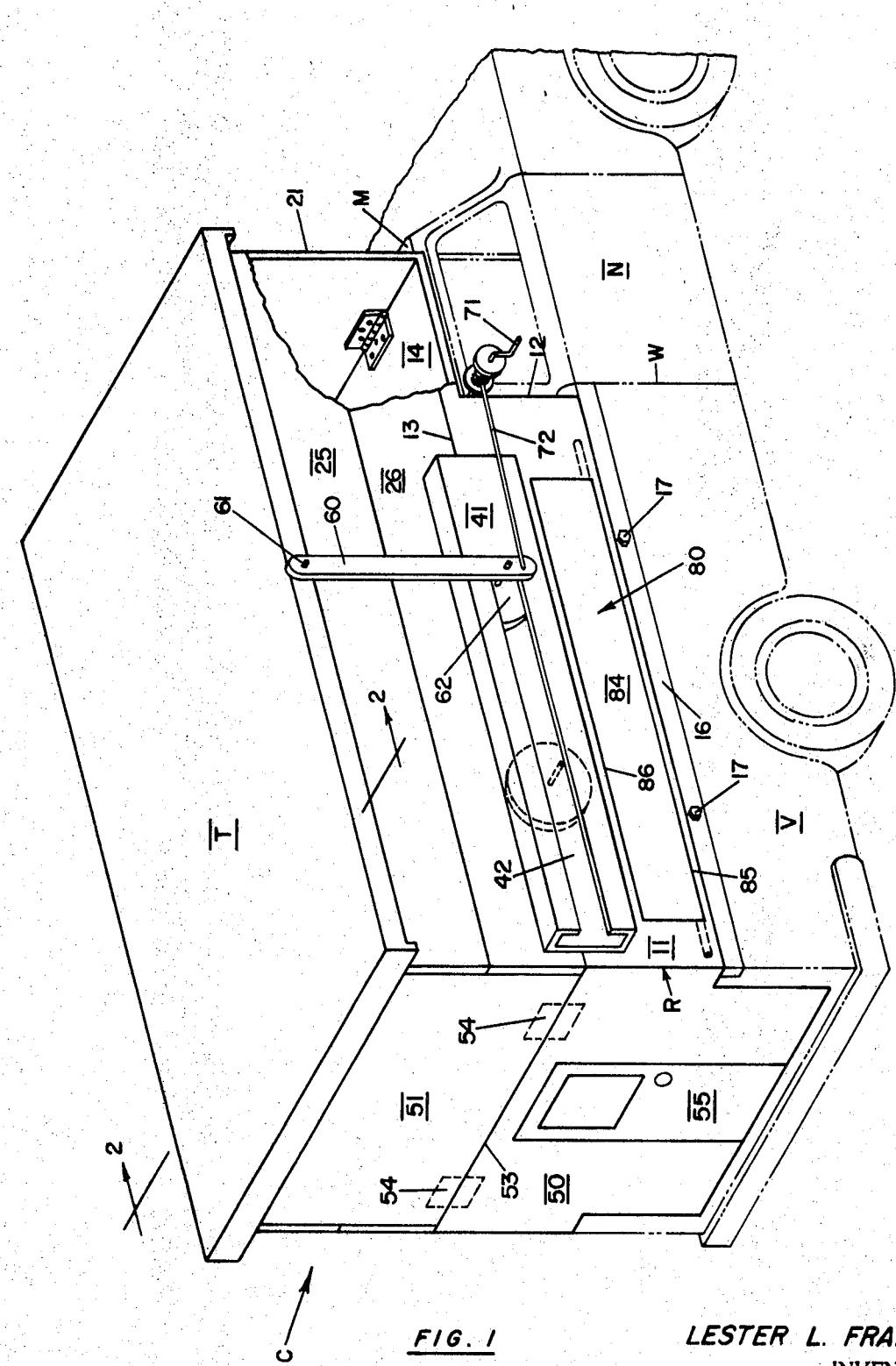
FIG. 1 is a perspective view of the downwardly collapsible camper shelter in the fully erected form, said shelter being advantageously mounted in combination with a suitable frame, herein as the rearwardly extending cargo box of a conventional pickup truck.

The floored open-top boxlike frame for the collapsible camper generically comprises a rectangular elongate horizontal floor e.g. "H," a pair of generally parallel elongate box-sidewalls e.g. "V," extending vertically rigidly uprightly from the two respective elongate extremities of the floor "H," and an intervening transverse box-frontwall e.g. "W," extending vertically rigidly uprightly from the transverse forward extremity of floor "H" and integrally connected to the forward upright extremities of box-sidewalls "V." Thus, the coplanar upper edges of box-sidewalls "V" and the intervening box-frontwall "W" provide a substantially horizontal U-shaped upper edge for the said open-top boxlike floored frame. Advantageously herein, for reasons to be amplified later, the open-top boxlike floored frame preferably comprises the rearwardly extending floored cargo box of a conventional pickup truck having a forward cab "N" for the operator and a substantially horizontal cab-roof "M." Typically, the pickup truck cargo box comprises a horizontal elongate rectangular floor "H," two parallel elongate cargo box-sidewalls "V" extending vertically rigidly uprightly from the two respective elongate extremities of floor "H," and an intervening transverse cargo box-frontwall "W" extending vertically rigidly uprightly from floor "H" immediately rearwardly of cab "N." The upper edges of box-sidewalls "V" and box-frontwall "W" provide a substantially horizontal U-shaped uniplanar upper edge for the cargo box, said upper edge being permanently disposed some distance below cab roof "M." The transverse open rearward end of the pickup truck cargo box is oftentimes temporarily closed with a removably upright tailgate, such tailgate not normally being required for the camper structure of the present invention.

Having now described a typical open-top boxlike floored frame environment for the present invention, the camper shelter structure will now be described. There is a permanently upright riser member "R" of substantially U-shaped horizontal cross section attached to the pickup truck cargo box frame and extending uprightly from the cargo box frame U-shaped horizontal upper edge. Riser member "R" herein comprises three integrally connected upright panels including a pair of substantially parallel elongate upright side-riser panels 11 each attached to the respective box-sidewalls "V" and extending rigidly uprightly therefrom and further including an intervening transverse front-riser panel 12 attached to the box-frontwall "W" as by means of vertical attachment-plates 15 whereby front-riser panel 12 extends rigidly uprightly from box-frontwall "W." The three panels 11—12 are also preferably rigidly connected together as at the two upright transverse extremities of front-riser panel 12. The elongate upper edge extremity of side-riser panels 11 and the transverse upper edge extremity of front-riser panel 12 provide a U-shaped substantially horizontal uniplanar upper edge 13 of permanent elevation for riser member "R," said upper edge 13 overlying the U-shaped upper edge for the cargo box frame. Moreover, the riser member upper edge 13 is disposed nearer to cab-roof "M" than to the cargo box upper edge, and preferably, said upper edge 13 is of substantially common elevation with cab-roof "M" at horizontal ledge-panel 14.

Figure 2:
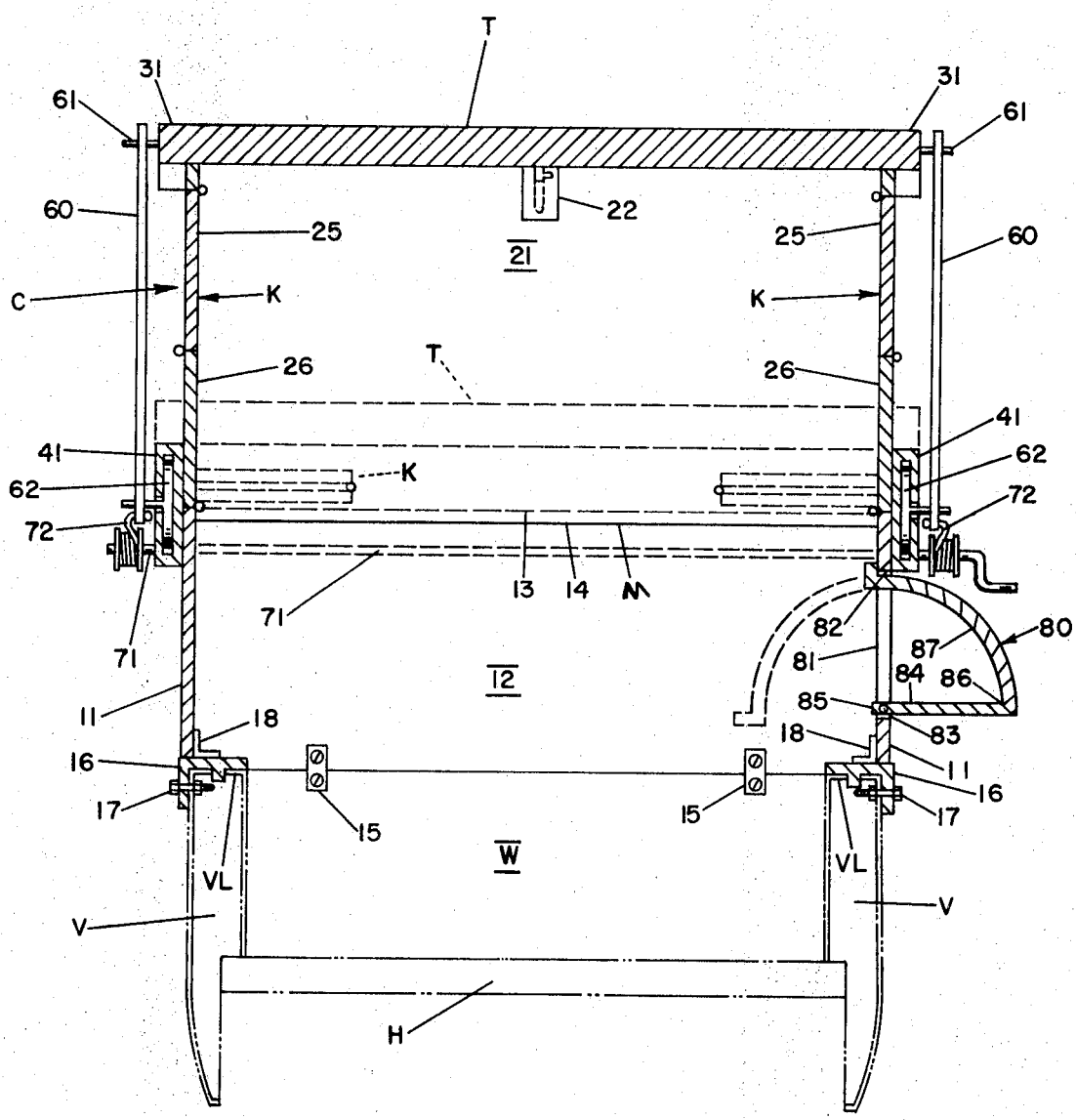
FIG. 2 is a transverse sectional elevational view taken along line 2—2 of FIG. 1, phantom lines being employed to indicate the downwardly collapsed form of the camper shelter structure.

FIG. 2 discloses an operable method for rigidly attaching the side-riser panels 11 to the respective box-sidewalls "V," in the customary situation wherein the pickup truck cargo box has for each box-sidewall "V" an inwardly extending upper edgeflange "VL" being provided with vertical holes therethrough, spaced at regular intervals in the longitudinal direction. For example, an elongate adapter-bar 16 of L-shaped cross section rests along the entire elongate length of each box-sidewall flanged upper edge "VL," said adapter-bar 16 having integral vertical studs extending downwardly through one or more of the vertical holes in flange "VL." Moreover, the upright cross-sectional leg of each adapter-bar 16 might be removably rigidly attached to the proximal box-sidewall "V" as by means of transverse threaded bolts 17. The side-riser panels 11 which extend along the respective adapter-bars 16 and the box-sidewalls "V" are herein rigidly uprightly attached to the respective adapter-bars 16 by means of L-shaped connector-brackets 18.

As will be pointed out later in greater detail, the canopy member portion of the present invention comprises a horizontal rectangularly elongate rigid roof "T" including a pair of substantially parallel elongate edge roof extremities 31. Roof "T" is vertically reciprocatable while remaining horizontal and includes an upper erected station as shown in solid line in FIGS. 1 and 2 and includes a lower collapsed station above riser upper edge 13 as shown in phantom line in FIG. 2, roof "T" remaining horizontally directly above frame floor "H" at the erected station and at the collapsed station. The vertical upright distance between canopy roof "T" at the erected station and the riser member upper edge 13 is a given-finite distance such as on the order of about 24 inches, while the vertical upright distance between roof "T" at the lower collapsed station and upper edge 13 is substantially less than said given-finite distance such as on the minor proportional order of about 24 inches. Thus, in a typical situation wherein the vertical height of each box-sidewall "V" above frame floor "H" is on the order of about 18 inches, and wherein the vertical height of riser member upper edge 13 is on the order of about 30 inches so that upper edge 13 is substantially coelevational with cab-roof "M," some 48 inches headroom exists within the collapsed camper to comfortably accommodate seated passengers therein while the pickup truck is traveling at highway speeds.

Preferably, the canopy member portion e.g. "C," comprises two elongate opposed inwardly foldable side-members "K" together with the intervening horizontal roof member "T," said roof "T" being pivotably connected to the upper elongate extremities of the opposed side-members "K." The lower extremities of the canopy inwardly foldable side-members "K" are pivotably connected along the respective upper edges 13 of side-riser panels 11 whereby said inwardly foldable parallel side-members "K" in the upright form provide the upper erected station for camper roof "T" while side-members "K" in the inwardly folded horizontal form shown in phantom line in FIG. 2 provide the downwardly collapsed station for camper roof "T." Each of the inwardly foldable side-members "K" comprises a pair of vertically disposed pivotably connected panels of substantially equal lengths including an upper-side panel 25 and a lower-side panel 26, the elongate lengths of elements "K," "T," 25, and 26 being substantially equal. Panels 25 and 26 are desirably of congruent rectangular shape, and the vertical uprightable height of panels 25 and 26 are substantially equal and less than one-half the transverse distance between side-riser panels 11 so as to accomplish the downwardly collapsed camper roof station shown in FIG. 2.

The collapsible camper construction of this invention can be made to extend loftily directly above the pickup truck cab-roof "M" when in the erected form so as to provide internal sleeping or storage space immediately above cab-roof "M;" however, when the camper is in the downwardly collapsed form, the canopy roof "T" is only some 4 inches above cab-roof "M" whereby the camper construction during overland highway travel has a relatively low center of gravity, has ample internal room therein for seated passengers, and offers minimal air-resistance. With the "supra cab-roof" construction of the preceeding sentence, elongate members 11, 16, "T," "K," 25, and 26 each commence immediately forwardly of the cargo box frame open backend e.g. at backend-panel 50; however, the members "T," "K," 25, and 26 are longer than members 11 and 16, such that the forward extremities of members "T," "K," 25, and 26 are disposed vertically above cab-roof "M." In the said "supra cab-roof" embodiments, there is a substantially permanently horizontal rigid ledge-panel 14 integrally rigidly attached to vertical front-riser panel 12; ledge-panel 14 is of rectangular shape and positioned wholly forwardly of and substantially coplanar with the riser member U-shaped upper edge 13 whereby said ledge-panel 14 is positioned immediately above or even resting upon cab-roof 37 M" such that the canopy member roof "T" is positioned at all times above cab-roof "M." There is a transverse rectangular uprightable upper-front panel 21, the lower transverse edge of which is pivotably attached to the transverse forward end of ledge-panel 14 whereby in the camper collapsed form upper-front panel 21 rests horizontally upon ledge-panel 14 immediately below inwardly folded panels 25 and 26 of side members "K." In the camper erected form, the upper portion of uprighted upper-front panel 21 is removably attached to the erected canopy as by means of slidable bolt-type fittings 22 removably engaged to canopy roof "T."

In the reversibly erectable-collapsible camper utilizing the canopy inwardly foldable side-members "K" to provide vertical movement of canopy roof "T," there is necessarily an "elevator means" to maintain some definite vertical space (such as on the typical order of about 4 inches) between the riser member upper edge 13 and the collapsed station of canopy roof "T" whereby the inwardly folded side-members "K" and upper-front panel 21 might be accommodated within said definite vertical space as depicted in phantom line in FIG. 2. Such "elevator means" might take the form of a pair of opposed elongate substantially parallel rails 41 attached to the external side of the respective side-riser panels 11 along their horizontal upper edges 13. Specifically, the upper elongate edges of the respective elevator rails 41 occupy a horizontal plane disposed some small but definite vertical space above the side-riser panels 11 (such as on the said order of about 4 inches) so that the transverse overhang extensions of collapsed canopy roof "T" along edges 31 abut against the upper edge of rails 41; thus, there is provided some said definite vertical space between the collapsed canopy roof "T" and riser member upper edge 13 to accommodate therewithin inwardly folded side-members "K," horizontal ledge-panel 14, and horizontal rearend-panel 51. While said rails 41 can be developed further into a later described track means type system for reversibly erecting and collapsing canopy "C," the rails 41 per se extending above riser member upper edge 13 do provide the aforedefined "elevator means."

The transverse backend of the camper in both the erected and collapsed forms may be defined by an upright backend-panel 50 removably attached to the cargo box frame and extending uprightly from floor "H" between box-sidewalls "V" and also between side-riser panels 11, the upper transverse edge 53 of backend-panel 50 being substantially coplanar with riser member upper edge 13. Backend-panel 50 includes an upright rectangular doorway-opening therethrough below upper edge 53 and a pivotally attached rectangular door panel 55 to permit ingress and egress for the camper. Analagous in function to upper-front panel 21, there is a transverse rectangular uprightable rearend-panel 51, the lower transverse edge of which is pivotally attached to backend-panel 50 along 53 as by means of hinges 54 whereby in the camper collapsed form rearend-panel 51 assumes a horizontal position immediately below inwardly folded panels 25 and 26 of side-member "K." In the camper erected form, the upper portion of uprighted rearend-panel 51 is removably attached to the erected canopy "C" as by means of the slidable bolt-type fittings e.g. 22, removably attached to canopy roof "T." The transverse forward and rearward edges of canopy roof "T" desirably include downwardly extending lips, herein of about 4 inch height, to provide weather-strip or sealing means at backend-panel upper edge 53 and at the forward extremity of ledge-panel 14.

When the system utilized for vertically moving the camper rigid roof "T" between its upper erected station and its lower collapsed station comprises the desirably inwardly foldable side-members "K," the preferred means for vertically moving roof "T" comprises a pair of opposed uprightable structurally rigid e.g. metallic, pivotal-links 60. Each pivotal-link 60 has an upper first end that is pivotably attached to a fixed location of roof "T," and has a lower movable second end that is longitudinally reciprocatably connected to side-riser panels 11 along a horizontal path of reciprocation commencing vertically below the first end pivotal connection with roof "T" e.g. vertically below 61. Thus, an upright position for the pivotal-link 60 (and having an uprightable dimensional height substantially equaling the vertical uprightable height of a side-member "K") provides the upward erected station for roof "T" while the substantially horizontal nonupright position of 60 provides the downwardly collapsed station for said canopy roof "T."

Preferably, the lower movable second end of each pivotal-link 60 is rollably or slidably engaged along a horizontal track means located along the outward side of each side-riser panel 11. For example, the said opposed rails 41, which do also functionally provide "elevator means" and vertically stabilize the uprighted side-members "K," might also additionally function as the track means for the movable lower end of pivotal-links 60. In this vane, the outward side of each rail 41 includes an elongate groove 42 of substantially C-shaped vertical cross section to provide a track means for a transverse roller 62 attached to the lower end of pivotal-link 60, said elongate groove 42 commencing at the rearward end of rail 41 e.g. at 50, said groove 42 extending horizontally forwardly to an abrupt forward extremity vertically below fixed pivot point 61. The first or upper end of each pivotal-link is pivotably connected to one of a pair of transversely aligned stationary pivot pins 61, each pivot pin 61 extending transversely outwardly of one of the respective roof elongate extremities 31. The second or lower end of each pivotal-link 60, remote of the pivot pin 61, has a transversely extending roller 62 rollably slidably engaged along track means 42 whereby the second end of each pivotal-link 60 is horizontally reciprocatable along track means 42.

Although the pair of opposed pivotal-links 60 might be manually reciprocated along the track means 42 by a pair of operators standing along each side-riser panel 11, the illustrated windlass means comprising transverse rotatably crank-type shaft 71 allows simultaneous uprighting of both pivotal-links 60 by a lone unassisted operator. Specifically, crank-type shaft 71 is journaled by riser member "R" vertically nearer to riser member upper edge 13 than to box-sidewalls "V"; moreover, the transverse journaled portion of shaft 71 is disposed forwardly of stationary pivot pins 61 i.e. forwardly of the forward extremity of the track means, and preferably at front-riser panel 12. There is a pair of equal-length flexible cables 72, each cable being tied to a transverse extension of shaft 71 outward of a side-riser panel 11 and also tied to a pivotal-link 60 nearer to its lower movable end e.g. 62, than to the pivotal connection with roof "T." Thus, a lone unassisted operator standing on the outward side of a side-riser panel 11 can crank rotatable shaft 71 thereby simultaneously causing both cables to wrappably wind up about shaft 71 and move roller 62 along track means 42 to the track-means forward extremity whereby pivotal-link 60 is upright and canopy "C" including roof "T" is fully erected. A convenient brake means (not shown) might be employed to brake windlass shaft 71 at its wind-up position to maintain the erected roof station. After panels 21 and 51 are moved to their horizontal positions, release of such brake means, and reverse directional rotation of windlass shaft 71 allow rollers 62 to move rearwardly while side-members "K" inwardly fold until canopy roof "T" reaches its collapsed lower station.

One or both of the side-riser panels 11 below the upper edge 13 and below elongate rail 41 can be provided with pivotal-drawer-type elongate sleeping berth 80. In this vane, one side-riser panel 11 is provided with an elongate rectangular opening 81 having a pair of opposed parallel elongate edges including upper elongate edge 82 and lower elongate edge 83. Uprightably pivotably disposed within elongate opening 81 and of substantially identical rectangular size and shape is a base-panel 84. The first elongate side 85 of base-panel 84 is pivotably attached along opening lower edge 83 whereby said base-panel 84 is adapted to assume a horizontal sleeping position as shown in solid line in FIG. 2. Sleeping-berth 80 includes a substantially 90° arcuate rigid cover 87 extending arcuately from the base-panel second elongate side 86 and through opening 81 at opening upper elongate edge 82. Arcuate cover 87 shields a reclining occupant from the elements. When not in use, as during highway travel, base-panel 84 is uprighted, and arcuate cover is disposed wholly within riser "R" as indicated in phantom line in FIG. 2.

From the foregoing, the construction and operation of the collapsible camper will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A collapsible camper shelter mounted in combination with an open-top boxlike frame including: a horizontal floor having two elongate substantially parallel extremities transversely spaced apart a finite distance; a pair of substantially parallel elongate upright box-sidewalls positioned along the respective elongate extremities of the frame floor; and a transverse box-frontwall extending upwardly from the forward portion of the frame floor, the upper extremities of the two box-sidewalls and the intervening transverse box-frontwall providing a substantially horizontal U-shaped upper edge for the frame, said collapsible camper shelter comprising:

A. A permanently upright riser member of substantially U-shaped horizontal cross-sectional shape attached to the said open-top boxlike frame and extending uprightly from the frame upper edge, said riser member having a substantially U-shaped upper edge of permanent elevation that overlies the frame upper edge; and B. A reversibly erectable-collapsible canopy member integrally attached to the riser member at a fixed elevation, said canopy member including: a pair of elongate uprightable side-members and an intervening substantially horizontal vertically reciprocatable roof positioned above the riser member upper edge and that permanently overlies both the U-shaped opening of the riser member and the frame floor, the vertical upright distance between the roof of the erected canopy and the riser member upper edge being a given-finite distance, the vertical upright distance between the roof of the downwardly collapsed canopy and the riser member upper edge being less than said given-finite distance.

2. The collapsible camper shelter of claim 1 wherein said camper is mounted in combination with a pickup truck motor vehicle that comprises a forward roofed cab integrally attached to a rearwardly extending open-top cargo box, said pickup truck cargo box providing the underlying frame for said collapsible camper shelter, said cargo box frame including: a substantially horizontal rectangularly elongate floor having two elongate parallel extremities, a said pair of box-sidewalls, and a said transverse box-frontwall disposed immediately rearwardly of the pickup truck's forward cab, the U-shaped horizontal upper edge for the cargo box being disposed vertically below the cab-roof; and wherein the riser member upper edge is disposed nearer to the cab-roof than to the cargo box upper edge.

3. The collapsible camper shelter combination of claim 2 wherein the canopy member including the roof and an upper-front panel portion thereof extend forwardly of the cargo box transverse box-frontwall whereby the canopy member roof is positioned at all times above the cab-roof.

4. The collapsible camper shelter combination of claim 2 wherein the riser member horizontal upper edge is of substantially common elevation with the cab-roof; and wherein the vertical upright distance between the roof of the downwardly collapsed canopy and the permanent elevation of the riser member upper edge is a minor proportion of said given-finite distance.

5. The collapsible camper shelter combination of claim 2 wherein the riser member below the upper edge thereof includes horizontal elongate track means; wherein the canopy member roof is rigid and is of rectangular shape including two elongate edges; wherein there are two elongate side-members for the canopy member each side-member comprising a pair of vertically disposed pivotably attached panels of substantially equal elongate lengths including an upper-side panel and a lower-side panel, the lower-side panel of the respective side-members being pivotably attached along the respective upper elongate edges of the riser member, and the upper-side panel of the respective side-members being pivotably attached along the respective elongate edges of the canopy member rigid roof whereby said side-members are each pivotably inwardly foldable toward each other to downwardly collapse the said canopy member including the intervening roof toward the riser member upper edge; and wherein there is a rigid uprightable pivotal-link having a transversely extending roller portion rollably slidably engaged with the track means, said pivotal-link remote of the roller portion being pivotably engaged with a stationary horizontal pivot pin attached to the canopy roof whereby an upright position for the pivotal-link provides the erected form of the camper shelter and whereby a substantially horizontal nonupright position for the pivotal-link provides the downwardly collapsed form of the camper shelter.

6. The collapsible camper shelter of claim 3 wherein the riser member comprises three integrally connected upright panels including a pair of substantially parallel elongate upright side-riser panels attached to the respective box-sidewalls and extending uprightly therefrom and further including an intervening transverse front-riser panel attached to the box-frontwall and extending uprightly therefrom; wherein there is a substantially permanently horizontal rigid ledge-panel integrally attached to the front-riser panel and extending horizontally forwardly of the front-riser panel, said ledge-panel being positioned wholly forwardly of and substantially coplanar with the riser member U-shaped upper edge whereby said ledge-panel is positioned immediately above the cab-roof so that the canopy member roof is positioned at all times above the ledge-panel.

7. The collapsible camper shelter of claim 6 wherein the canopy member roof is structurally rigid and is of rectangular shape including two elongate edges; wherein there are two elongate side-members for the canopy member, each side-member comprising a pair of vertically disposed pivotably attached panels of substantially equal elongate lengths including an upper-side panel and a lower-side panel, the lower-side panel of the respective side-members being pivotably attached along the respective upper elongate edges of the side-riser panels, and the upper-side panel of the respective side-members being pivotably attached along the respective elongate edges of the canopy member rigid roof, the vertical uprightable height of the respective upper-side and lower-side panels being substantially equal and less than one-half the transverse distance between the parallel side-riser panels whereby said side-members are each pivotably inwardly foldable toward each other to downwardly collapse said canopy member including the intervening roof toward the riser-member upper edge with a definite vertical space existing between the riser member upper edge and the canopy member roof to accommodate therein the inwardly folded side-members of the canopy member when the camper shelter is in the downwardly collapsed form.

8. The collapsible camper shelter of claim 7 wherein the canopy member includes an uprightably transverse frontend-panel pivotably attached to the transverse forward end of the ledge-panel, said frontend-panel providing an upright forward end enclosure for the canopy member in the erected form, and said frontend-panel pivoting rearwardly to a collapsed horizontal position between the ledge-panel and the inwardly folded side-members; wherein there are elevator means to maintain the said definite vertical spacing between the canopy member roof and the ledge-panel when the canopy member is in the downwardly collapsed condition; wherein the riser member side-riser panels include below the upper edge thereof horizontal elongate track means having a forward extremity; and wherein there is a structurally rigid uprightable pivotal-link having a transversely extending roller portion rollably slidably engaged with the horizontal track means, said pivotal-link remote of the roller portion being pivotably engaged with a stationary horizontal pivot pin attached to the canopy member roof and vertically overlying the forward extremity of the track means whereby an upright position for the rollable pivotal-link provides the erected condition for the camper shelter and a substantially horizontal nonupright position for the pivotal-link provides the downwardly collapsed form of the camper shelter.

9. The collapsible camper shelter of claim 8 wherein the track means comprises a pair of elongate horizontal stationary rails positioned on the outward side of the side-riser panels; each of said track rails being substantially C-shaped in vertical cross section commencing at the rearward end of each track rail; wherein there is a pair of uprightable pivotal-links rollably engaged along each of the respective track rails; wherein the canopy member roof includes a pair of transversely aligned horizontal stationary pivot pins extending outwardly from the respective elongate roof edges to provide said pivotal connection with the remote portion of said pivotal-links; wherein there is a transverse horizontal rotatable windlass means including a horizontal shaft journaled by the riser member and extending tansversely outwardly from both the riser member riser-panels nearer to the riser member upper edge than to the box-sidewalls, said transverse windlass being positioned forwardly of the forward extremity of the track means, said windlass means comprising a pair of flexible cables, each cable being attached to an outward extension of the windlass shaft and to a pivotal-link nearer to the roller portion than to the roof pivotal connection thereof.

10. The collapsible camper shelter of claim 9 wherein the vertical upright height for each riser-panel above the upper edge of the associated box-sidewall exceeds the height of the uprighted side-member for the erected canopy member; wherein the windlass member transverse shaft is positioned at the front-riser panel and substantially parallel thereto; wherein there is an upright backend-panel removably attached to the pickup truck cargo box and positioned transversely between the box-sidewalls and also positioned transversely between the opposed side-riser panels, the upper transverse edge of the said backend-panel being substantially coplanar with the U-shaped upper edge of the riser member, said backend-panel including an upright doorway-opening therethrough and a pivotably attached door panel therefor, the upper extremities for the doorway-opening and the pivotably associated door panel being disposed below the upper transverse edge of the backend-panel; and wherein the canopy member includes an uprightly transverse rearend-panel pivotably attached to the transverse upper end of the backend-panel, said rearend-panel providing an upright rearward end enclosure for the canopy member in the erected condition, and said rearend-panel pivoting forwarding to a collapsed horizontal position immediately below the inwardly folded side-members.

11. The collapsible camper shelter of claim 10 wherein the elevator means comprises opposed track rails each extending planarly upwardly from the outward side of the respective riser panels to provide a horizontal upper extremity for each track rail, together with transverse extensions for the roof panel that overlie said track rails; wherein the respective transverse forward and rearward edges of the canopy member roof each include a downwardly extending transverse lip to provide sealer means at the ledge-panel and at the backend-panel upper edge, respectively, when the canopy member is in the downwardly collapsed condition; and wherein at least one of said riser-panels below the track rail is provided with an elongate rectangular opening, an elongate sleeping-berth pivotably disposed within said riser-panel elongate opening and comprising an uprightable rectangular base-panel, the first elongate side of the base panel being pivotably attached along the lower of the two elongate edges of the riser-panel elongate opening whereby said sleeping-berth base-panel is adapted to pivot outwardly from the riser-panel and assume a horizontal sleeping position, said sleeping-berth also including a substantially 90° arcuate rigid cover component extending arcuately from the base-panel second elongate side and through the riser-member rectangular opening along the upper elongate side thereof and ultimately inwardly of the riser-panel whereby said arcuate cover member overlies the horizontally outwardly extended base-panel.

12. A collapsible camper shelter mounted in combination with a open-top boxlike frame having a substantially horizontal floor, a pair of substantially parallel elongate upright box sidewalls positioned along the floor, and a box front-wall transversely intersecting the box sidewalls whereby the boxlike frame has a substantially U-shaped horizontal upper edge, said collapsible camper comprising:

A. A permanently upright riser member of substantially U-shaped horizontal cross-sectional shape attached to the said open-top top boxlike frame and extending uprightly from the frame upper edge, said riser member having a substantially U-shaped upper edge of permanent elevation that overlies the frame upper edge; and B. A reversibly erectable-collapsible canopy member integrally attached to the riser member, said canopy member including; a pair of elongate uprightable side-members and an intervening substantially horizontal vertically reciprocatable roof positioned above the riser member upper edge and that permanently overlies both the U-shaped opening of the riser member and the frame floor, each of the side-members comprising a pair of pivotably attached panels of substantially equal elongate lengths including an upper-side panel and a lower-side panel, the lower-side panel of the respective side-members being pivotably attached at a fixed elevation along respective parallel upper extremities of the riser member, and the upper-side panel of the respective side-members being pivotably attached along respective elongate edges of the canopy member roof portion whereby said side-members are each pivotably inwardly foldable toward each other to downwardly collapse said canopy member including the roof portion toward the riser member upper edge.

13 The collapsible camper structure of claim 12 wherein at least one of the riser-panels is provided with an elongate rectangular opening, an elongate sleeping-berth pivotably disposed within said riser-panel elongate opening and comprising an uprightable rectangular base-panel, the first elongate side of said base-panel being pivotably attached along the lower of the two elongate edges of the riser-panel elongate opening whereby said sleeping-berth base-panel is adapted to pivot outwardly from the riser-panel and assume a horizontal sleeping position, said sleeping-berth also including a substantially 90° arcuate rigid cover component extending arcuately from the base-panel second elongate side and through the riser-panel rectangular opening along the upper elongate side thereof and ultimately inwardly of the riser-panel whereby said arcuate cover member overlies the horizontally outwardly extended base-panel.